(12) United States Patent
Roby et al.

(10) Patent No.: US 6,191,236 B1
(45) Date of Patent: Feb. 20, 2001

(54) BIOABSORBABLE SUTURE AND METHOD OF ITS MANUFACTURE

(75) Inventors: Mark S. Roby, Killingworth; Darlene P. Nebinger, Oxford; Steven L. Bennett, Southington, all of CT (US); Cheng-Kung Liu, Glenside, PA (US); Jon T. Reinprecht, Waterbury, CT (US)

(73) Assignee: United States Surgical Corporation, Norwalk, CT (US)

( * ) Notice: Under 35 U.S.C. 154(b), the term of this patent shall be extended for 0 days.

(21) Appl. No.: 08/948,707

(22) Filed: Oct. 10, 1997

Related U.S. Application Data

(60) Provisional application No. 60/028,149, filed on Oct. 11, 1996.

(51) Int. Cl.[7] ............................. C08G 63/06; C08G 63/78
(52) U.S. Cl. ........................ 525/411; 525/413; 525/415; 528/354; 528/361
(58) Field of Search .................................. 525/411, 415, 525/413; 578/354, 361

(56) References Cited

U.S. PATENT DOCUMENTS

| | | | |
|---|---|---|---|
| 2,668,162 | 2/1954 | Lowe | 260/78.3 |
| 2,683,136 | 7/1954 | Higgins | 260/78.3 |
| 2,703,316 | 3/1955 | Schneider | 260/78.3 |
| 2,758,987 | 8/1956 | Salzberg | 260/78.3 |
| 3,225,766 | 12/1965 | Baptist et al. | 128/335.5 |
| 3,268,486 | 8/1966 | Klootwijk | 260/78.3 |
| 3,268,487 | 8/1966 | Klootwijk | 260/78.3 |
| 3,297,033 | 1/1967 | Schmitt | 128/335.5 |
| 3,422,181 | 1/1969 | Chirgwin, Jr. | 264/345 |
| 3,442,871 | 5/1969 | Schmitt et al. | 260/78.3 |
| 3,463,158 | 8/1969 | Schmitt et al. | 128/334 |
| 3,468,853 | 9/1969 | Schmitt et al. | 260/78.3 |
| 3,531,519 | 9/1970 | Parkin et al. | 260/524 |
| 3,565,869 | 2/1971 | DeProspero | 260/78.3 |
| 3,597,449 | 8/1971 | DeProspero et al. | 260/340.2 |
| 3,620,218 | 11/1971 | Schmitt et al. | 128/334 R |
| 3,626,948 | 12/1971 | Glick et al. | 128/335.5 |
| 3,636,956 | 1/1972 | Schneider | 128/335.5 |
| 3,733,919 | 5/1973 | Rupp, II | 74/242.16 |
| 3,736,646 | 6/1973 | Schmitt et al. | 29/458 |
| 3,772,420 | 11/1973 | Glick et al. | 264/102 |
| 3,781,349 | 12/1973 | Ramsey et al. | 260/535 P |
| 3,784,585 | 1/1974 | Schmitt et al. | 260/861 |
| 3,792,010 | 2/1974 | Wasserman et al. | 260/32.2 R |
| 3,797,490 | 3/1974 | Schneider | 128/334 R |
| 3,839,297 | 10/1974 | Wasserman et al. | 260/78.3 R |
| 3,846,382 | 11/1974 | Ramsey et al. | 260/78.3 R |
| 3,867,190 | 2/1975 | Schmitt et al. | 117/138.8 A |
| 3,878,284 | 4/1975 | Schmitt et al. | 264/184 |
| 3,902,497 | 9/1975 | Casey | 128/296 |
| 3,937,223 | 2/1976 | Roth | 128/325 |
| 3,982,543 | 9/1976 | Schmitt et al. | 128/335.5 |
| 3,987,937 | 10/1976 | Coucher | 222/193 |
| 4,033,938 | 7/1977 | Augurt et al. | 260/78.3 R |
| 4,045,418 | 8/1977 | Sinclair | 260/78.3 R |
| 4,052,988 | 10/1977 | Doddi et al. | 128/335.5 |
| 4,057,537 | 11/1977 | Sinclair | 260/78.3 R |
| 4,060,089 | 11/1977 | Noiles | 128/325 |
| 4,137,921 | 2/1979 | Okuzumi et al. | 128/335.5 |
| 4,157,437 | 6/1979 | Okuzumi et al. | 528/354 |
| 4,196,207 | 4/1980 | Boyle, Jr. et al. | 528/370 |
| 4,243,775 | 1/1981 | Rosensaft et al. | 525/415 |
| 4,246,904 | 1/1981 | Kaplan | 128/335.5 |
| 4,273,920 | 6/1981 | Nevin | 528/361 |
| 4,275,813 | 6/1981 | Noiles | 206/339 |
| 4,279,249 | 7/1981 | Vert et al. | 128/92 D |
| 4,300,565 | 11/1981 | Rosensaft et al. | 128/335.5 |
| 4,429,080 | 1/1984 | Casey et al. | 525/415 |
| 4,438,253 | 3/1984 | Casey et al. | 528/86 |
| 4,452,973 | 6/1984 | Casey et al. | 528/354 |
| 4,526,938 | 7/1985 | Churchill et al. | 525/415 |
| 4,643,191 | 2/1987 | Bezwada et al. | 128/335.5 |
| 4,653,497 | 3/1987 | Bezwada et al. | 128/335.5 |
| 4,705,820 | 11/1987 | Wang et al. | 524/381 |
| 4,716,203 | 12/1987 | Casey et al. | 525/408 |
| 4,744,365 | 5/1988 | Kaplan et al. | 128/335.5 |
| 4,745,160 | 5/1988 | Churchill et al. | 525/415 |
| 4,788,979 | 12/1988 | Jarrett et al. | 128/335.5 |
| 4,791,929 | 12/1988 | Jarrett et al. | 128/335.5 |
| 4,838,267 | 6/1989 | Jamiolkowski et al. | 128/335.5 |
| 4,857,602 | 8/1989 | Casey et al. | 525/408 |
| 4,891,263 | 1/1990 | Kotliar et al. | 428/225 |
| 4,896,802 | 1/1990 | Nanami | 223/46 |
| 4,916,193 | 4/1990 | Tang et al. | 525/413 |
| 4,920,203 | 4/1990 | Tang et al. | 525/409 |
| 5,007,923 | 4/1991 | Bezwada et al. | 606/231 |
| 5,019,094 | 5/1991 | Bezwada et al. | 606/230 |
| 5,037,950 | 8/1991 | Bezweda et al. | 528/354 |
| 5,066,772 | 11/1991 | Tang et al. | 528/354 |
| 5,080,665 | 1/1992 | Jarrett et al. | 606/219 |
| 5,120,802 | 6/1992 | Mares et al. | 525/415 |
| 5,145,945 | 9/1992 | Tang et al. | 528/370 |
| 5,152,781 | 10/1992 | Tang et al. | 606/230 |
| 5,185,408 | 2/1993 | Tang et al. | 525/415 |
| 5,225,520 | 7/1993 | Kennedy et al. | 528/354 |
| 5,236,444 | 8/1993 | Muth et al. | 606/230 |

(List continued on next page.)

FOREIGN PATENT DOCUMENTS

| | | |
|---|---|---|
| 779291 | 7/1957 | (GB) . |
| 1332505 | 10/1973 | (GB) . |
| 1414600 | 11/1975 | (GB) . |
| 2102827 | 2/1983 | (GB) . |

OTHER PUBLICATIONS

Biodegradable polymers for use in surgery—polyglycolic/poly(actic acid) home–and copolymers:1; Polymer; D.K. Gilding and A.M. Reed; Dec. 1979; vol. 20; p. 1459–1464.

*Primary Examiner*—Patricia A. Short

(57) ABSTRACT

Block copolymers wherein one of the blocks is made from hard phase forming monomers and another of the blocks is made from soft phase forming monomers copolymerized with randomly intermingled units of other soft phase forming monomers. The copolymers are useful in forming surgical articles, including both monofilament and multifilament sutures.

2 Claims, 1 Drawing Sheet

U.S. PATENT DOCUMENTS

| | | | |
|---|---|---|---|
| 5,252,701 | 10/1993 | Jarrett et al. | 528/354 |
| 5,314,989 | 5/1994 | Kennedy et al. | 528/354 |
| 5,322,925 | 6/1994 | Muth et al. | 528/354 |
| 5,403,347 | 4/1995 | Roby et al. | 606/230 |
| 5,431,679 | 7/1995 | Bennett et al. | 606/230 |
| 5,494,620 | 2/1996 | Liu et al. | 264/28 |
| 5,502,159 | 3/1996 | Liu et al. | 528/354 |
| 5,522,841 | 6/1996 | Roby et al. | 606/230 |
| 5,554,170 | 9/1996 | Roby et al. | 606/230 |
| 5,633,342 * | 5/1997 | Versev | 528/355 |

* cited by examiner

BIOABSORBABLE SUTURE AND METHOD OF ITS MANUFACTURE

This application claims priority from Provisional Application No. 06/028,149, filed Oct. 11, 1996.

TECHNICAL FIELD

Absorbable block copolymers having one of the blocks predominantly hard phase forming monomers and another of said blocks made from randomly copolymerized soft phase forming monomers are described. Processes for making the copolymers and surgical articles made totally or in part from such copolymers, including both monofilament and multifilament sutures, are also described.

BACKGROUND

Bioabsorbable surgical devices such as, for example, sutures, made from copolymers derived from one or more of glycolide, lactide, p-dioxanone, epsilon-caprolactone and/or trimethylene carbonate are known in the art. However, filaments prepared from certain such copolymers are not dimensionally stable and require a freezing step to maintain a desired physical dimension. See, e.g. U.S. Pat. No. 5,494,620 which discloses the details of and benefits derived from a freezing operation. U.S. Pat. No. 5,403,347 discloses a block copolymer wherein one of the blocks is made from hard phase forming monomers (preferably glycolide) and another of the blocks is made from soft phase forming monomers (e.g., p-dioxanone) copolymerized with randomly intermingled units of other soft phase forming monomers (e.g., trimethylene carbonate). In each working example of U.S. Pat. No. 5,403,347, after spinning and drawing a monofilament made from the copolymers disclosed therein, the monofilament is subjected to a freezing operation. Thus, while the resulting monofilaments have excellent physical properties for use as a suture, four distinct steps are used in the working examples; namely, spinning, drawing, freezing and annealing.

It would be desirable to provide a bioabsorbable suture which exhibits good flexibility and handling characteristics while maintaining other desired characteristics, such as knot strength, knot retention and desired absorption characteristics. It would also be desirable to produce such a suture in fewer manufacturing steps than have been previously employed.

SUMMARY

It has now been found that absorbable surgical articles may be formed from a block copolymer having one of the blocks made from hard phase forming monomers and another of the blocks made from random copolymers of soft phase forming monomers without the need of a freezing step. Hard phase forming monomers include glycolide and lactide while soft phase forming monomers include 1,4 dioxane-2-one and 1,3 dioxane-2-one and caprolactone. Preferably, the block copolymers used in forming surgical articles include one block having glycolic acid ester units as a predominant component thereof. A "predominant component" is a component which is present in an amount greater than 50 mole percent.

The copolymers are prepared by copolymerizing the soft phase forming monomers to form a random copolymer. Hard phase forming monomer is then combined with the random copolymer and polymerization is carried out at a temperature of less than about 205° C.

In particularly useful embodiments, the block copolymers can be spun into fibers. The fibers can be fabricated into both monofilament and braided multifilament sutures.

A process for manufacturing a suture exhibiting excellent strain energy and/or increased knot performance for a given size is also described herein. The process includes the steps of extruding the aforementioned block copolymer, to provide a monofilament fiber, drawing the solidified monofilament at a draw ratio of from about 3:1 to about 10:1 to provide a drawn monofilament, and annealing the drawn monofilament to provide the finished suture.

DESCRIPTION OF THE PREFERRED EMBODIMENTS

Figure 1:
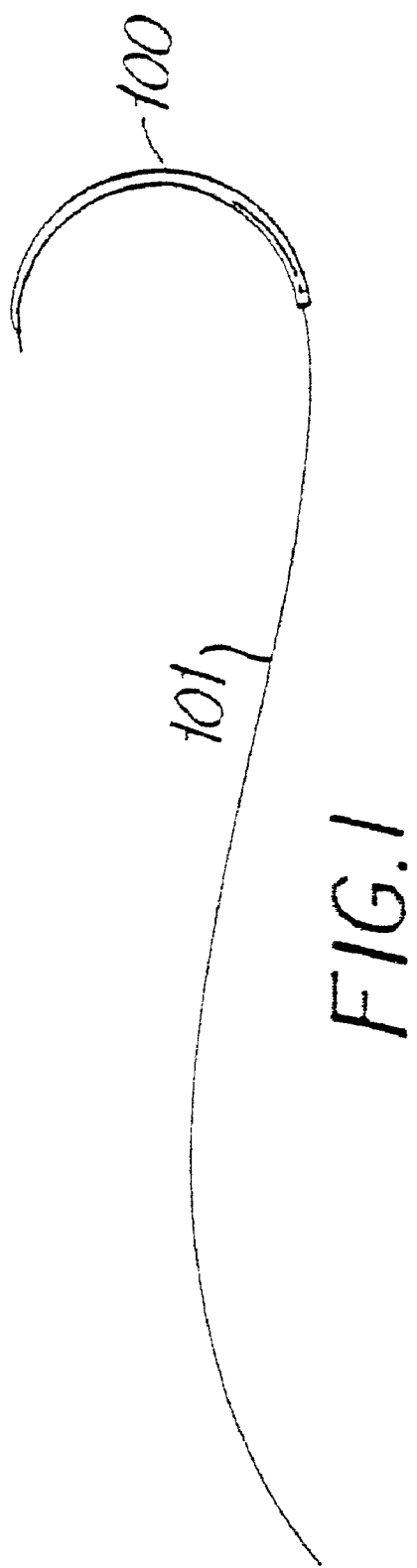
FIG. 1 is a perspective view of a suture made in accordance with this disclosure attached to a needle.

It has been found that a block copolymer having two specific types of blocks, an "A" block having a proportion of glycolic acid ester units as the predominant component thereof and a "B" block comprising 1,3 dioxane-2-one randomly copolymerized with 1,4 dioxane-2-one, can advantageously be combined to form a block copolymer useful in forming surgical elements.

The block copolymer compositions include an A block formed from a copolymer which has glycolide as the predominant component thereof. That is, glycolide comprises at least 50 mole percent of the first block. Preferably, glycolide comprises at least about 60 mole percent of the first block and most preferably at least about 95 mole percent glycolide. The glycolide may be copolymerized with any monomer which provides an absorbable copolymer to form the A block. Such monomers include but are not limited to lactide, trimethylene carbonate, p-dioxanone, and epsilon-caprolactone.

The B block of the copolymer has 1,4 dioxane-2-one and 1,3 dioxane-2-one linkages. Preferably 1,4 dioxane-2-one comprises from about 20 mole percent to about 80 mole percent, and more preferably from about 35 mole percent to about 65 mole percent of the B block. Most preferably, 1,4 dioxane-2-one comprises at least about 35 mole percent of the B block, the remainder of the block comprising 1,3 dioxane-2-one. Copolymers of 1,3 dioxane-2-one and 1,4 dioxane-2-one having an inherent viscosity of from about 0.5 to about 2 dl/g measured at 30° C. and a concentration of 0.25 g/dl in chloroform or HFIP may generally be used as the second block.

The block copolymers can be prepared by preparing a statistical pre-polymer made from two or more soft phase forming monomers such as, for example, a pre-polymer having a random distribution of 1,4 dioxane-2-one and 1,3 dioxane-2-one linkages. The prepolymer can be prepared using conventional techniques. For example, the soft phase forming monomers can be dried, mixed in a reaction vessel with an initiator (e.g. Diethylene glycol) and a polymerization catalyst (e.g., stannous chloride) and heated at temperatures from about 140° C. to about 160° C. about 2 hours to about 4 hours and then at temperatures in the range from about 120° C. to about 140° C. for about 2 hours to about 4 hours. Then, the monomers needed to form the other block or blocks are added directly to the reactor to thereby form the block copolymer. Preferably, glycolide is added and polymerized at temperatures less than about 205° C. for less than 60 minutes from the time addition of the glycolide is complete.

In one embodiment, the polymerization reaction used in the formation of the above mentioned pre-polymer is stopped short of completion, leaving residual 1,4 dioxane-2-one. Then, one or more hard phase forming monomers needed to form the other block or blocks are added directly to the reactor vessel to react with the residual 1,4 dioxane-2-one and the pre-polymer to form block copolymers having 1,4 dioxane-2-one linkages in each block. The polymerization temperature used after addition of the one or more hard phase forming monomers is kept below about 205° C. and the polymerization time is less than about 60 minutes.

In forming the block copolymers, the A (predominantly glycolide) block may be present in an amount from about 50 to about 80 percent by weight based on the weight of the final block copolymer. The B (random copolymer) block may be present in an amount from about 20 to about 50 weight percent based on the weight of the final block copolymer. Preferably, the A block comprises between about 60 and about 70 weight percent of the block copolymer. In a particularly useful embodiment, the A block comprises about 70 weight percent and the B block comprises about 30 weight percent of the final block copolymer. The copolymers can have a molecular weight such that their inherent viscosity is from about 1.2 to about 1.7 dl/g, and preferably from about 1 to about 1.40 dl/g measured at 30° C. at a concentration of 0.25 g/dl in chloroform or hexafluoroisopropanol (HFIP).

Each A and B block may comprise a single type of recurring monomeric unit. Alternatively, each block may comprise more than one type of recurring monomeric unit randomly distributed throughout each block. The block copolymers may have repeating block units such as AB, ABA, ABAB, ABABA, BABA, etc.; with ABA being preferred.

The block copolymers can be formed into surgical articles using any know technique, such as, for example, extrusion, molding and/or solvent casting. The copolymers can be used alone, blended with other absorbable compositions, or in combination with non-absorbable components. A wide variety of surgical articles can be manufactured from the copolymers described herein. These include but are not limited to clips and other fasteners, staples, sutures, pins, screws, prosthetic devices, wound dressings, drug delivery devices, anastomosis rings, and other implantable devices. Fibers made from the present copolymers can be knitted or woven with other fibers, either absorbable or nonabsorbable to form meshes or fabrics. Compositions including these block copolymers can also be used as an absorbable coating for surgical devices. Preferably, however, the copolymers are spun into fibers to be used as sutures, either monofilament or multifilament.

Multifilament sutures made from the copolymers described herein can be prepared by methods known in the art. Braid constructions such as those disclosed and claimed in U.S. Pat. No. 's 5,059,213 and 5,019,093 are suitable for the multifilament sutures disclosed herein.

A suitable apparatus for the manufacture of monofilament sutures from the present block copolymers is described in U.S. Pat. No. 5,403,347, the disclosure of which is incorporated herein in its entirety by this reference. However, due to the lower polymerization temperatures used after addition of the hard phase forming monomer(s), dimensionally stable filaments can be prepared from the present copolymers without utilizing any freezing operation. Thus, the present block copolymers provide a significant manufacturing advantage over previous copolymers. Suitable parameters for spinning, drawing and annealing monofilaments made from the present copolymers are summarized in Table I, below.

TABLE I

CONDITIONS OF MANUFACTURING MONOFILAMENT SUTURES FROM THE PRESENT BLOCK COPOLYMERS

Extrusion Conditions

| | |
|---|---|
| extruder screw, rpm | 0.5–8.0 |
| pump, rpm | 2.0–30 |
| barrel temp., ° C., zone A | 170–215 |
| barrel temp., ° C., zone B | 170–215 |
| barrel temp., ° C., zone C | 170–215 |
| clamp temp., ° C., | 170–215 |
| adapter temp., ° C. | 170–215 |
| pump temp., ° C. | 170–215 |
| block temp., ° C. | 170–215 |
| barrel melt temp., ° C. | 170–220 |
| pump melt temp., ° C. | 170–225 |
| spinneret melt temp., ° C. | 170–225 |
| barrel pressure, psi | 1000–3000 |
| pump pressure, psi | 350–2000 |
| spinneret pressure, psi | 500–3000 |
| pump size, cc per revolution | 0.16–0.297 |
| quench bath temp., ° C. | 15–40 |

Drawing (Orienting) Operation

| | |
|---|---|
| first oven or draw bath temp., ° C. | 25–50 |
| first godet, mpm | 2–20 |
| second godet, mpm | 9–95 |
| second oven temp, ° C. | off–120 |
| third godet, mpm | 10–95 |
| draw ratio #1 | 5:1–10:1 |
| draw ratio #2 | 1.1:1–1.5:1 |
| fourth godet, mpm (for sizes 1 and 0 only) | 10–95 |
| third oven, ° C. (for sizes 1 and 0 only) | 50–120 |
| draw ratio #3 | 0.96:1–0.98:1 |

Annealing Operation

| | |
|---|---|
| max oven temp., ° C. | 125 |
| time (hrs.) | 5–20 |

Annealing of the suture may be accomplished with essentially no shrinkage of the suture. in carrying out the annealing operation, the desired length of suture may be wound around a creel and the creel placed in a heating cabinet maintained at the desired temperature, e.g. about 70° C. to about 150° C., as described in U.S. Pat. No. 3,630,205. After a suitable period of residency in the heating cabinet, e.g., about 18 hours or so, the suture will have undergone essentially no shrinkage. As shown in U.S. Pat. No. 3,630,205, the creel may be rotated within the heating cabinet in order to insure uniform heating of the monofilament or the cabinet may be of the circulating hot air type in which case uniform heating of the monofilament will be achieved without the need to rotate the creel. Thereafter, the creel with its annealed suture is removed from the heating cabinet and when returned to room temperature, the suture is removed from the creel, conveniently by cutting the wound monofilament at opposite ends of the creel.

An alternative annealing method involves winding a single layer of the monofilament onto a drum and placing the drum within an oven. The temperature within the oven is increased in ten degree increments from room temperature to 90° C. with each increment being maintained for one hour. The temperature is then increased to 125° C. and held for six hours. The monofilament can then be cut from the drum in lengths suitable for use as sutures. The annealed sutures, optionally attached to surgical needles, are then ready to be packaged and sterilized.

The suture disclosed herein, suture 101, may be attached to a surgical needle 100 as shown in FIG. 1 by methods well known in the art. Wounds may be sutured by passing the needled suture through tissue to create wound closure. The needle preferably is then removed from the suture and the suture tied.

It is further contemplated that one or more medico-surgically useful substances can be incorporated into compositions containing the copolymers described herein. Examples of such medico-surgically useful substances include, for example, those which accelerate or beneficially modify the healing process when particles are applied to a surgical repair site. So, for example, the suture can carry a therapeutic agent which will be deposited at the repair site. The therapeutic agent can be chosen for its antimicrobial properties, capability for promoting repair or reconstruction and/or new tissue growth. Antimicrobial agents such as broad spectrum antibiotic (gentamycin sulfate, erythromycin or derivatized glycopeptides) which are slowly released into the tissue can be applied in this manner to aid in combating clinical and sub-clinical infections in a tissue repair site. To promote repair and/or tissue growth, one or several growth promoting factors can be introduced into the sutures, e.g., fibroblast growth factor, bone growth factor, epidermal growth factor, platelet derived growth factor, macrophage derived growth factor, alveolar derived growth factor, monocyte derived growth factor, magainin, and so forth. Some therapeutic indications are: glycerol with tissue or kidney plasminogen activator to cause thrombosis, superoxide dimutase to scavenge tissue damaging free radicals, tumor necrosis factor for cancer therapy or colony stimulating factor and interferon, interleukin-2 or other lymphokine to enhance the immune system.

It is contemplated that it may be desirable to dye the sutures made in accordance with the present disclosure in order to increase visibility of the suture in the surgical field. Dyes known to be suitable for incorporation in sutures can be used. Such dyes include but are not limited to carbon black, bone black, D&C Green No. 6, and D&C Violet No. 2 as described in the handbook of U.S. Colorants for Food, Drugs and Cosmetics by Daniel M. Marrion (1979). Preferably, the sutures are dyed by adding up to about a few percent and preferably about 0.2% dye, and most preferably about 0.06% to about 0.08% dye, such as D&C Violet No. 2 to the resin prior to extrusion.

In order that those skilled in the art may be better able to practice the compositions and methods described herein, the following examples are given as an illustration of the preparation of block copolymers as well as of the preparation and superior characteristics of the sutures made from the copolymers. It should be noted that the invention is not limited to the specific details embodied in the examples and further that all ratios or parts recited are by weight.

EXAMPLE 1

1,3 dioxane-2-one (13,000 grams) and 1,4 dioxan-2-one (8,400 grams) are added to a reactor along with 5.0 grams of stannous chloride and 30 grams of diethylene glycol. The mixture is dried for about an hour under flow of nitrogen. The reactor temperature is then set at 150° C., and polymerization is conducted with stirring under a nitrogen atmosphere for about 3 hours. The setting of the reactor is then decreased to 130° C. and stirring is continued for another 3 hours. The 1,3 dioxane-2-one /1,4 dioxane-2-one copolymer is then sampled.

Five thousand grams of dry glycolide are then added to the reactor. The setting for the temperature of the reactor is then increased to 197° C. When the temperature of the reactor reaches 195° C., 25,000 additional grams of glycolide are added with continued stirring and the temperature setting is increased to 202° C. The polymerization is continued for about 55 minutes from the final addition of glycolide.

The reaction product is isolated, comminuted, and treated to remove residual reactants using known techniques.

EXAMPLE 2

1,3dioxane-2-one (5,200 grams) and 1,4 dioxane-2-one (3,360 grams) are added to a reactor along with 2.0 grams of stannous chloride and 12.0 grams of diethylene glycol. The mixture is dried for about six hours under a flow of nitrogen. The reactor temperature is then set at 150° C. and polymerization is conducted with stirring under a nitrogen atmosphere for about 3 hours. The setting of the reactor is then decreased to 130° C. and stirring is continued for about an additional 3 hours. The 1,3 dioxane-2-one/1,4 dioxane-2-one copolymer is then sampled.

Two thousand grams of dry glycolide are then added to the reactor. The setting for the temperature of the reactor is then increased to 197° C. When the temperature of the reactor reaches 195° C., 10,000 grams of glycolide are added with continued stirring and the temperature setting is increased to 202° C. The polymerization is continued for about fifty five minutes from completion of the second addition of glycolide.

The reaction product is isolated comminuted, and treated to remove residual reactants using known techniques. The copolymer is then heated under vacuum to remove residual water, residual solvent and/or unreacted monomer.

EXAMPLE 3

Monofilament sutures of various sizes were fabricated from the resins of Example 1 and Example 2 using parameters within the ranges listed in Table I.

Table II below sets forth the average physical properties of various size sutures made from copolymers prepared in accordance with the present disclosure. Knot-pull strength in kilograms was tested in accordance with U.S.P. XXI, tensile strength, sutures (881).

TABLE II

| Physical Property | Size | | | | | | | |
|---|---|---|---|---|---|---|---|---|
| | 1 | 0 | 2/0 | 3/0 | 4/0 | 5/0 | 6/0 | 7/0 |
| average diameter(mm) | 0.531 | 0.458 | 0.352 | 0.292 | 0.213 | 0.188 | 0.110 | 0.08 |
| average knot-pull strength(kg) | 7.8 | 6.91 | 4.06 | 2.8 | 1.88 | 1.09 | 0.5 | 0.3 |

Modifications and variations of the compositions and processes disclosed herein are possible in light of the above teachings. it is therefore to be understood that changes may be made in particular embodiments described which are within the full intended scope of the invention as defined by the claims.

What is claimed is:

1. A method of making a copolymer comprising the steps of:
   a) polymerizing a mixture of 1,4 dioxane-2-one and 1,3 dioxane-2-one within a reaction vessel to the point where all the 1,3 dioxane-2-one is incorporated in a polymer but residual 1,4 dioxane-2-one monomer remains;
   b) adding glycolide to the reaction vessel; and
   c) polymerizing at a temperature below about 205° C. to produce a block copolymer.

2. The method of claim 1, further comprising the step of removing residual monomer from the block copolymer.

* * * * *

UNITED STATES PATENT AND TRADEMARK OFFICE
CERTIFICATE OF CORRECTION

PATENT NO.    : 6,191,236 B1
DATED         : February 20, 2001
INVENTOR(S)   : Mark S. Roby, Steven L. Bennett, Cheng-Kung Liu and Jon T. Reinprecht It is certified that error appears in the above-identified patent and that said Letters Patent is hereby corrected as shown below:

<u>Title page,</u>
Item [56], References Cited, U.S. PATENT DOCUMENTS, insert
-- 4,916,207, 4/10/90 Boyle, Jr., et al --

Signed and Sealed this

Twenty-sixth Day of November, 2002

Attest:

Attesting Officer

JAMES E. ROGAN
*Director of the United States Patent and Trademark Office*